United States Patent [19]

Le Marchand et al.

[11] Patent Number: 4,938,492

[45] Date of Patent: Jul. 3, 1990

[54] SHOPPING TROLLEY OF THE NESTABLE TYPE COMPRISING A RACK WHICH IS CAPABLE OF WITHDRAWAL BENEATH ITS CARRIER BASKET

[75] Inventors: Alain Le Marchand, Reichstett; Daniel Bailly, Bischheim, both of France

[73] Assignee: Ateliers Reunis Caddie, Schiltigheim, France

[21] Appl. No.: 389,972

[22] Filed: Aug. 7, 1989

[30] Foreign Application Priority Data

Jun. 16, 1989 [EP] European Pat. Off. ........... 89401700

[51] Int. Cl.⁵ .............................................. B62B 11/00
[52] U.S. Cl. ................................ 280/33.992; 211/151; 211/181; 211/151; 211/181
[58] Field of Search ...................... 280/33.991, 33.992, 280/33.997; 248/249; 211/151, 181

[56] References Cited

U.S. PATENT DOCUMENTS

| 2,890,058 | 6/1959 | Cauthon | 280/33.992 |
| 2,903,269 | 9/1959 | Hennion | 280/33.992 |
| 2,918,294 | 12/1959 | Hennion | 280/33.992 |
| 4,647,055 | 3/1987 | Weill | 280/33.992 |

FOREIGN PATENT DOCUMENTS 3444969 6/1986 Fed. Rep. of Germany .

Primary Examiner—Charles A. Marmor
Assistant Examiner—Michael Mar
Attorney, Agent, or Firm—Young & Thompson

[57] ABSTRACT

A rack for supporting bulky objects is capable of sliding between an inclined position of withdrawal beneath the carrier basket of a shopping trolley and a horizontal position of use at the rear of the basket. Two sloping parallel wires superposed in the same vertical plane and having a smaller spacing at the front than at the rear form lateral guides for the rack and front support struts of the bottom frame. The movable rack has a flat, U-shaped structure of resilient wires so that its front portion is capable of elastic deformation in the transverse direction. At each front corner, the rack has a hook-shaped element slidably engaged in the corresponding lateral guide. The rear end of the rack is slidably mounted on a cross-member for supporting the rack in its position of rearward extension.

5 Claims, 4 Drawing Sheets

FIG. 5
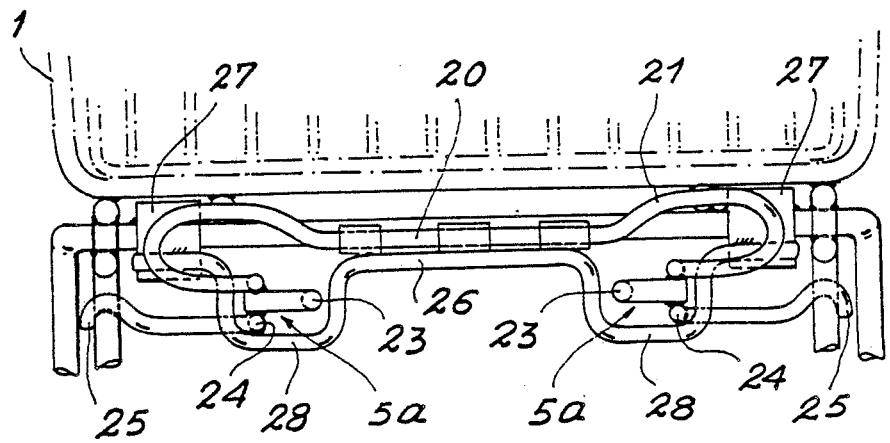
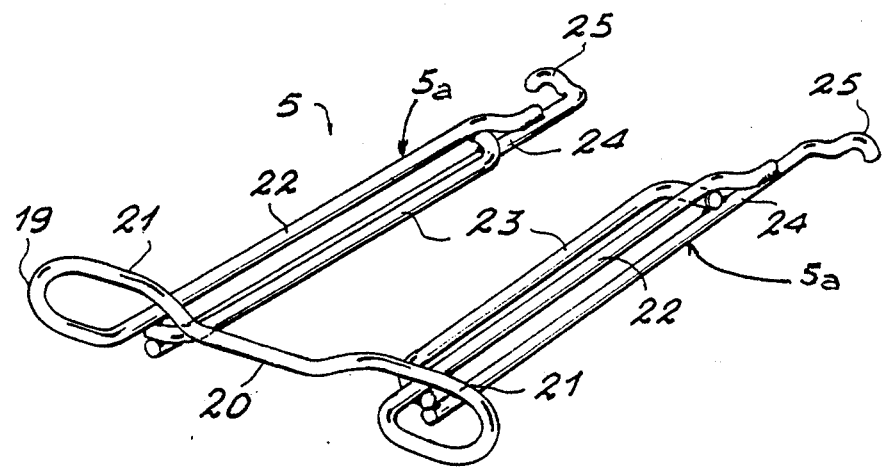
FIG. 6

SHOPPING TROLLEY OF THE NESTABLE TYPE COMPRISING A RACK WHICH IS CAPABLE OF WITHDRAWAL BENEATH ITS CARRIER BASKET

BACKGROUND OF THE INVENTION

1. Field of the Invention

The present invention relates to shopping trolleys which are put at the disposal of customers in self-service stores and more specifically to trolleys of the nestable type.

2. Description of the Prior Art

A trolley of this type has a carrier basket which is intended to receive objects purchased by the user and is located at a certain height above the ground. At its rear end, the basket is closed by a flap mounted so as to be capable of pivoting freely at the level of its top edge. This permits engagement of the front end of the basket of another identical trolley at the time of nesting, or engagement of trolleys within each other, when they are in readiness for use.

In order to permit the possibility of transporting bulky objects such as boxes, cartons or packs containing bottles of beer or other beverages, some trolleys of this type are provided with an additional support which can be withdrawn beneath the carrier basket when it is not in use.

Thus U.S. Pat. Nos. 2,890,058 and 2,903,269 and also German patent No. DE 34.44.969 describe trolleys in which provision is made for an additional support consisting of a rack which is mounted so as to be capable of sliding in the longitudinal direction between a position of withdrawal beneath the carrier basket and a position of use in which it is moved away from the rear end of this latter, at least to a partial extent. Different modes of assembly are accordingly contemplated for permitting the sliding displacement of said retractable rack on the bottom frame of the corresponding trolley.

Thus FIG. 2 of German patent No. DE 34.44.969 illustrates a trolley having a bottom frame which carries two inclined guides disposed on both sides. These guides have the function of guiding rollers or the like which are carried laterally by the front end of the retractable rack. Moreover, provision is made behind said guides for a cross-member which is intended to support the retractable rack in a substantially horizontal position when it is extended to the rear of the trolley.

However, this arrangement is subject to a certain number of disadvantages. The first of these lies in the fact that the addition of lateral guides complicates the structure of the bottom frame and consequently increases the cost price of the trolley unit. Moreover, when the movable rack is extended in the rearward direction and has not yet received a load to be carried, there is a risk of an accidental return of the rack to its withdrawn position under the action of the slightest impact. This obviously constitutes an objectionable disadvantage if this incident occurs when the user is about to place a load on the rack.

For the reasons given in the foregoing, the object of the invention is to construct a trolley of the same general type but so designed as to overcome these disadvantages.

SUMMARY OF THE INVENTION

With the above object in view, the distinctive features of the trolley in accordance with the invention are as follows:

the lateral guides of the movable rack are constituted by two sloping members which form at the same time the front bearing struts of the bottom frame, said members being so arranged as to extend from the rear portion of the bottom wall of the basket and to terminate at the front end of the frame, said two members each consist of two parallel wires which are superposed in the same vertical plane and have a smaller spacing at the front than at the rear, the movable rack has a flat U-shaped structure provided with an opening which is directed towards the front, said structure being formed of resilient wires so that the front portion of said structure has a possibility of elastic deformation in the transverse direction by relative inward or outward displacement of its lateral legs, at each front corner, said rack is adapted to carry a projecting member such as a hook which is slidably engaged within the corresponding lateral guide whilst the rear end of said rack is slidably mounted on the supporting member provided at the rear.

Thus, taking into account the fact that the elements forming the lateral guides converge towards each other, the front portion of the movable rack is subjected to a slight elastic compression in the transverse direction when said rack is thrust back to its position of withdrawal. In consequence, any accidental return of the rack to this position under the action of a mere impact is made radically impossible. Such a return movement can in fact be produced only by deliberately exerting a certain thrust on the rear end of the movable rack. Moreover, the structure of the trolley frame is highly simplified by the fact that the lateral guides are constituted by members which form the front bearing struts of the trolley at the same time.

BRIEF DESCRIPTION OF THE DRAWINGS

FIG. 5 is a fragmentary view in elevation showing the rear end of the same rack when it is located in its position of withdrawal.

FIG. 6 is a perspective view of the retractable rack as shown separately.

DETAILED DESCRIPTION OF THE INVENTION

Figure 1:
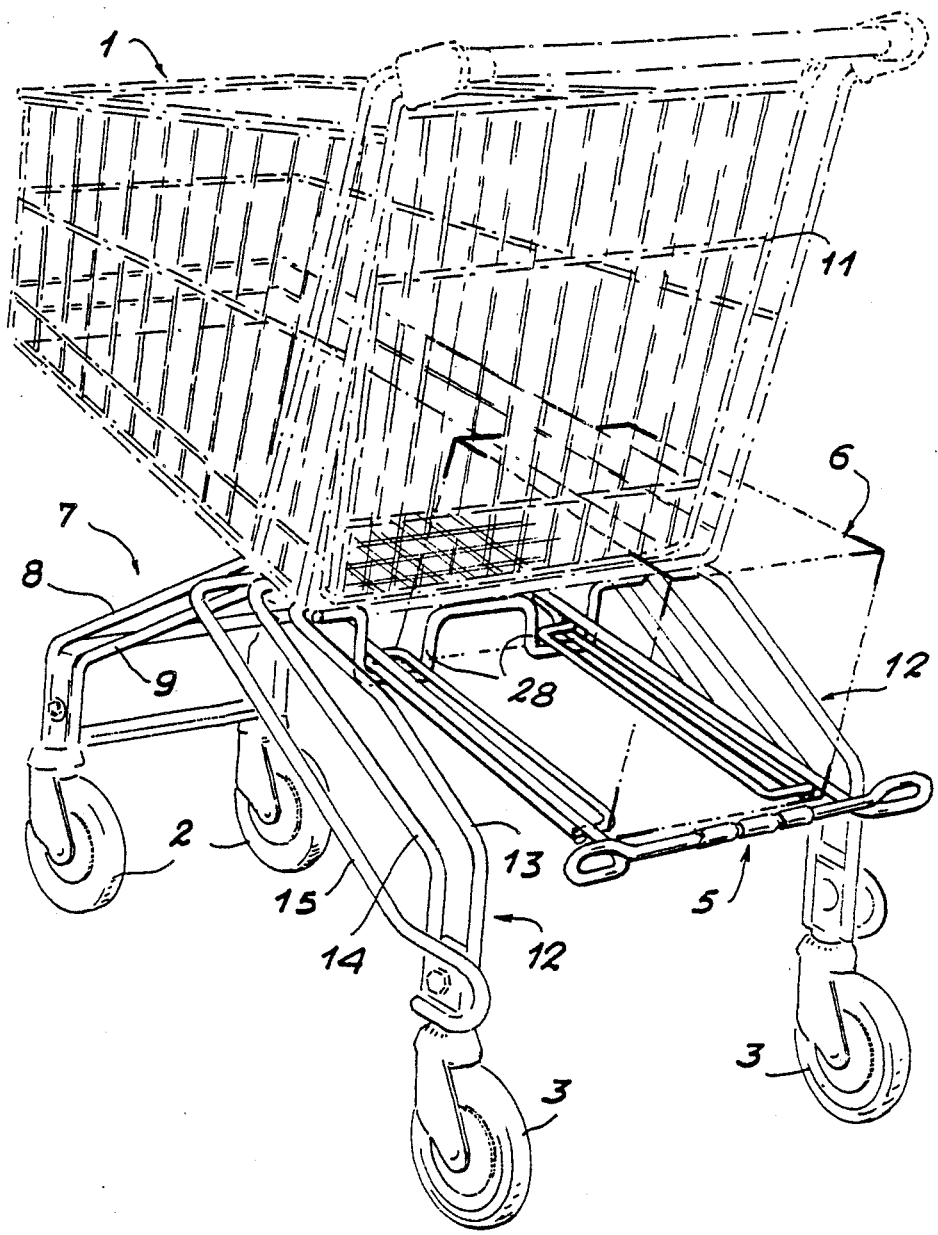
FIG. 1 is a perspective view of a trolley in accordance with the invention and looking on the rear end of said trolley.

The trolley shown in FIG. 1 has a carrier basket 1 placed at a predetermined height above the front wheels 2 and rear wheels 3. Said basket is fixed on a bottom frame designated by the general reference 4. Provision is made beneath the basket for a movable rack 5 which can be extended to the rear of said basket so as to constitute an additional support for receiving a relatively bulky load such as, for example, a box 6 of cardboard or the like.

The front portion of the frame 4 is provided with two sloping members 7 which are placed on each side and constitute two front bearing struts while at the same time serving as lateral guides for the front end of the movable rack 5. Each member 7 is constituted by two parallel wires 8 and 9 which are superposed in the same vertical plane. At their upper ends, these two wires are fixed against the rear portion of the bottom wall 10 of the basket 1. These two wires are downwardly inclined towards the front and their front ends carry the front wheels 2 of the trolley. In order to permit nesting of said trolley in the rear end of another identical trolley, the two front struts 7 have a smaller spacing at the front than at the rear. With the same objective, the rear wall of the basket 1 is constituted by a flap 11 which is mounted so as to be capable of pivoting freely about its top edge, thus permitting the engagement of the front end of the basket of another trolley within the rear portion of the trolley under consideration.

Figure 2:
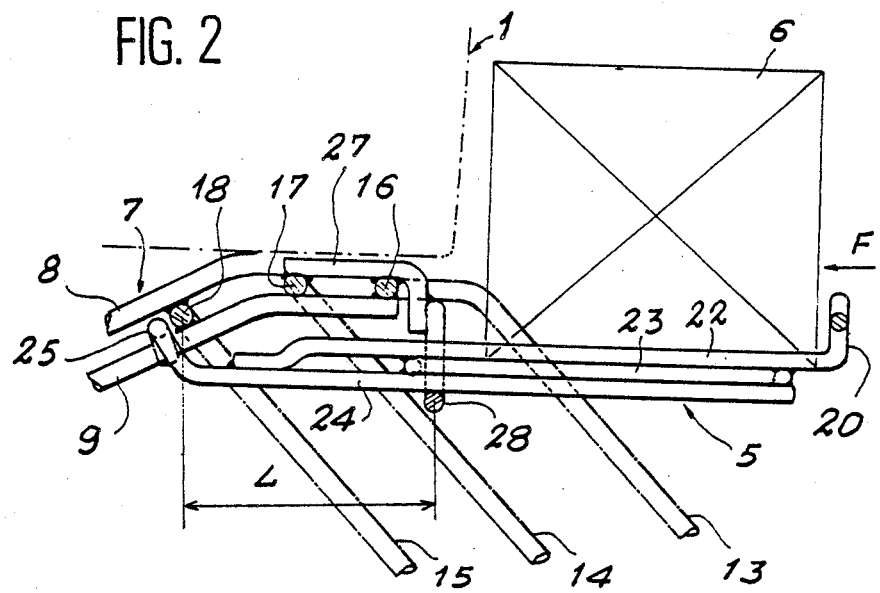
FIG. 2 is fragmentary view in side elevation in which the retractable rack is shown in its position of rearward extension.
Figure 3:
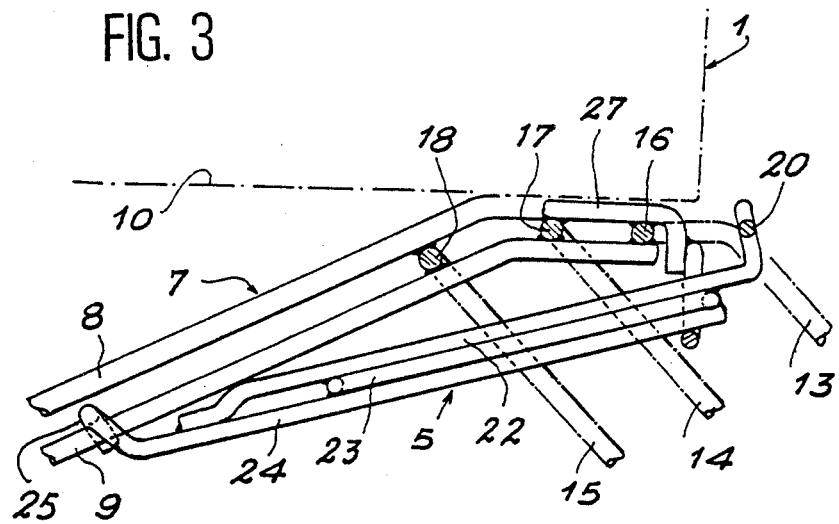
FIG. 3 is a similar view showing the same rack in the position of withdrawal beneath the trolley basket.
Figure 4:
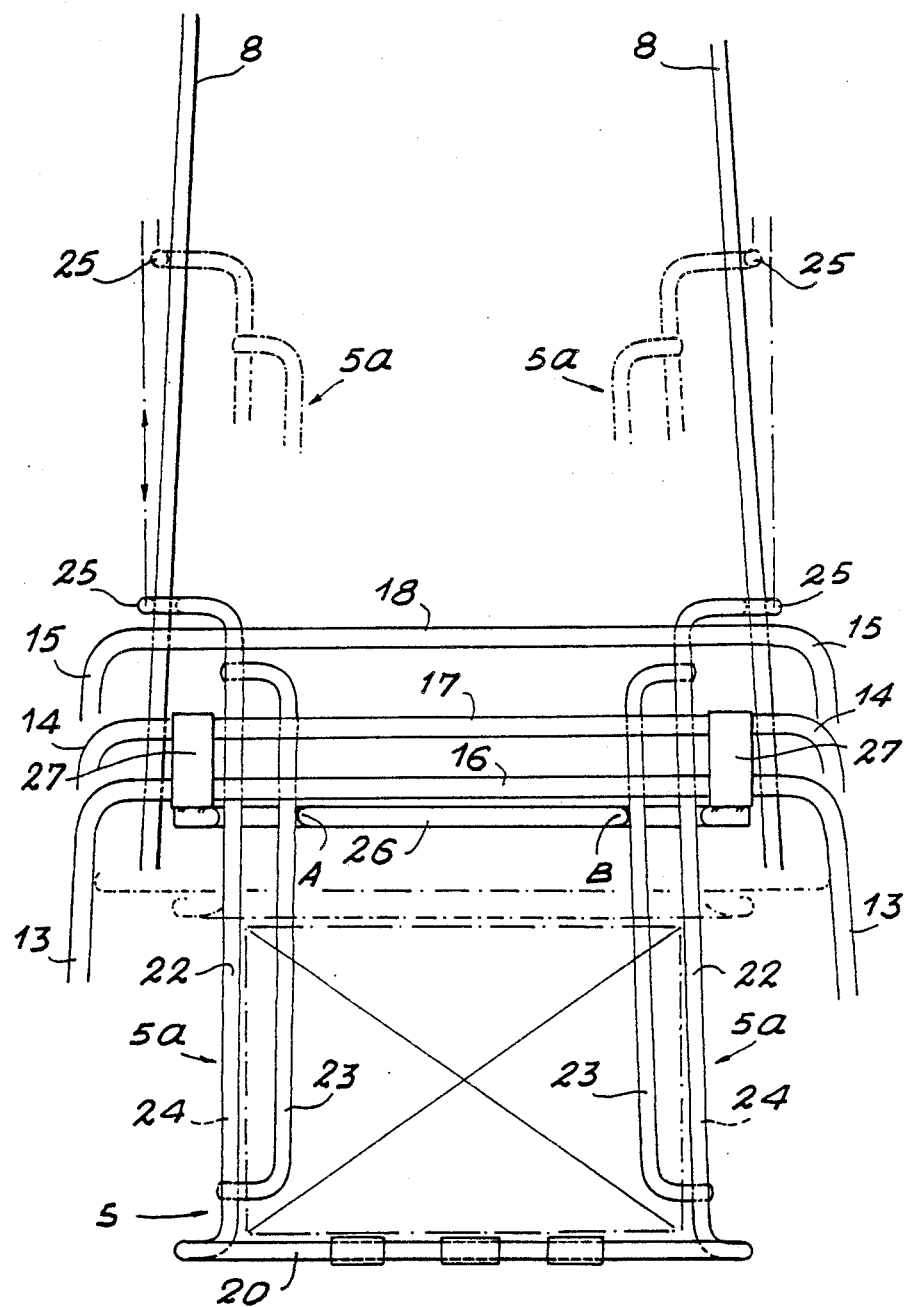
FIG. 4 is a schematic top view of said retractable rack as shown in full lines in its position of outward extension and partially in chain-dotted lines in its position of withdrawal.

In regard to the rear portion of the frame 4, this portion is constituted by two lateral bearing struts 12 which are inclined in the direction opposite to the inclination of the front struts 7. The upper ends of said bearing struts 12 are fixed against the rear portion of the bottom wall 10 of the basket 1 and their lower ends are adapted to carry the rear wheels 3. In the example shown in the drawings, the two bearing struts are constituted by the lateral legs of three arches 13, 14 and 15 of wire. The central leg 16, 17 and 18 of each arch extends horizontally beneath the bottom wall of the basket 1 and each of these central legs, or at least one or two legs, are engaged between the two superposed wires 8 and 9 constituting the front struts 7 of the base 4 (as shown in FIGS. 2 and 3).

It is clearly apparent from FIG. 6 that the movable rack 5 has a U-shaped structure, the open portion of which is directed towards the front. This structure is formed of resilient wires and comprises a first elbowed wire 19 having the general shape of a U, the central leg 20 of which constitutes the rear edge of the rack 5. The ends of said leg 20 have loops 21 which project above the general plane of the rack 5 so as to constitute a retaining flange for the box 6 or other load which may be placed on the rack when this latter is in use.

In regard to the lateral legs 22 of the wire 19, they constitute the corresponding legs 5a of the U-shaped structure of the rack 5. Each leg is completed by two other parallel wires 23 and 24, these different wires being welded to each other at their ends. However, the ends of the wires 24 extend beyond the others and terminate in an elbowed portion forming a hook 25.

These two hooks which are therefore located at the front corners of the rack 5 are engaged in guides constituted by the space existing between the two superposed wires 8 and 9 of each front strut 7 of the frame. It is worthy of note that each hook 25 is engaged around the corresponding lower wire 9. This accordingly ensures that the front end of the rack 5 is guided by the lateral guides constituted by the front struts 7 of the frame.

In the position of withdrawal of the rack 5, the rear end of this latter rests on a horizontal supporting member provided beneath the rear end of the basket 1. Said supporting member is constituted by a wire cross-member 26, the ends of which are fixed on two brackets 27 carried by the central legs 16 and 17 of the two rear arches 13 and 14 of the base. This cross-member 26 has two portions 28 which are elbowed in the shape of a U in a vertical plane so as to form strap hangers on each of which is engaged the corresponding lateral leg 5a of the movable rack 5 which is capable of sliding therein (as shown in FIG. 5). These two strap hangers 28 thus form both supporting members for the rack 5 and additional guide members at the time of displacements of this latter.

As shown in FIG. 2, the central leg 18 of the rear arch 15 of the frame constitutes a stop for the hooks 25 of the movable rack 5 at the upper ends of the lateral guides 7. This stop is located at a point such that the rack 5 is accordingly stopped in a position in which it is located substantially in a horizontal plane. The lateral legs 5a of said rack are then applied on the strap hangers 28 formed by the rear cross-member 26. Stability of said rack is ensured by the fact that said cross-member is located behind the stop 18 at a distance L from this latter (as shown in FIG. 2).

By reason of the particular structure of the movable rack 5, the front portion of this latter has a possibility of elastic deformation in the transverse direction. This is essential in the case considered since the lateral guides which serve to guide the front end of said rack are constituted by the front bearing struts 7 of the base, said struts being necessarily in convergent relation at the front end in order to permit nesting of a number of trolleys.

In consequence, when the movable rack is in its position of withdrawal, its front end is slightly compressed in a resilient manner. As will be readily apparent, this compression disappears when the movable rack is extended to the rear in its position of use. The result thereby achieved is that, in order to produce a subsequent return movement of said rack to its position of withdrawal, a certain thrust has to be deliberately exerted on its rear edge 20 in the direction F in order to overcome the slight resistance set up by the convergence of the two guides 7.

Under these conditions, the movable rack 5 is thus maintained in a stable manner in its position of rearward extension. It is therefore altogether unlikely that the rack will return unexpectedly to its position of withdrawal under the action of a mere accidental impact.

However, deliberate withdrawal of the rack 5 does not give rise to any difficulty. In fact, as already mentioned, it is only necessary to exert a thrust F on the rear edge of said rack. It should be added that, from the moment when this operation has been started, the downward inclination of the guides 7 facilitates sliding of the rack down to its position of withdrawal. It should be noted that, in the position of rearward extension of the rack 5, the inner wires 23 of the two lateral legs 5a of this latter are in contact, at the level of the points A and B, with the corresponding sides of the guiding strap hangers 28. This ensures that the rack 5 is maintained in a correct position at the time of rearward extension and achieves excellent guiding of said rack 5 when it is subsequently pushed towards the front end. In addition, this avoids any risk of jamming of said rack in the event that a forward thrust is exerted obliquely on its rear edge 20.

It should be noted that, if a trolley is left after use with its movable rack 5 in the rearwardly extended position, the return of the rack to the position of withdrawal takes place automatically at the time of engagement of another trolley within the rear portion of the trolley considered. In such a case, the front end of said other trolley applies pressure on the rear edge 20 of the rack 5 of the first trolley, thus ensuring its return to the position of withdrawal.

In fact, in this position, said rack is inclined as shown in FIG. 3. In consequence, its presence in no way interferes with the engagement of another identical trolley within the rear portion of the trolley considered.

As has already been mentioned, the frame structure of the trolley in accordance with the invention is simplified by the fact that the lateral guides of the rack 5 are constituted by sloping members 7 which form the front bearing struts of the trolley at the same time. This offers the further advantage of reducing the cost price of the trolley as a whole.

As indicated earlier, the trolley in accordance with the invention is primarily intended to enable customers of self-service stores to transport one or a number of bulky objects in addition to the objects of smaller size which are usually placed within the carrier basket. It is thus an easy matter to transport bulky objects such as boxes, cartons or packs containing bottles of beer or other beverages as well as many other different types of particularly cumbersome packages.

What is claimed is:

1. A trolley and especially a shopping trolley comprising a bottom frame including a front portion and a rear portion, wheels attached to lower ends of said front and rear frame portions, a carrier basket fixed on the bottom frame of said trolley and placed at a predetermined height above the level of the wheels, and a rack which is intended to serve as a support for a box or other bulky object, said rack being mounted so as to be capable of moving between an inclined position of withdrawal beneath the basket and a horizontal extended position of use behind said basket, said front frame portion including two lateral guides which are downwardly inclined in the forward direction for supporting said rack in the withdrawal position, and a supporting member located behind the upper ends of the lateral guides for supporting said rack in the extended position, said lateral guides of the movable rack being constituted by two sloping members which form at the same time the front bearing struts of the bottom frame, said members extending rearwardly to the rear portion of the bottom wall of the carrier basket, each of said two members consisting of two parallel wires which are superimposed in the same vertical plane, the lateral spacing between the forward ends of said two members being less than the lateral spacing between the rearward ends of said two members, said movable rack having a flat U-shaped structure with forwardly extending, laterally spaced legs forming an opening along the front portion of the rack, said rack being formed of resilient wires so as to permit elastic deformation of said lateral legs upon inward displacement of said lateral legs in a transverse direction when said rack is moved to its position of withdrawal, the forward end of each lateral leg of said rack being adapted to carry a projecting hook member which is slidably engaged between the parallel wires of a corresponding lateral guide and the lateral legs of said rack being slidably mounted on said supporting member.

2. A trolley according to claim 1, wherein the lateral legs of the movable rack are each constituted by parallel wires and the supporting member provided at the rear has two U-shaped portions forming guiding strap hangers which are disposed vertically and within each of which is slidably mounted one of the lateral legs of the movable rack.

3. A trolley according to claim 2, wherein each lateral leg of the rack includes an inner wire which, in the position of rearward extension of said rack, is in contact with the corresponding side of the respective guiding strap hanger.

4. A trolley according to claim 1, wherein the rear portion of the bottom frame is constituted by two bearing struts which are inclined in the direction opposite to the front bearing struts and which are formed by the lateral legs of at least two arches of wire, the central legs of which are rigidly fixed to the upper ends of the front bearing struts, at least one central leg being engaged between the two parallel wires which form the front bearing struts.

5. A trolley according to claim 4, wherein the central leg of one of the arches which forms the rear bearing struts of the frame constitutes a stop at the upper end of the lateral guides so as to stop the movable rack in a position such as to be extended horizontally at the rear of the trolley.

* * * * *